United States Patent [19]

Sowa et al.

[11] Patent Number: 4,744,401

[45] Date of Patent: May 17, 1988

[54] PNEUMATIC TIRE REINFORCED WITH FABRIC

[75] Inventors: Nobuhiro Sowa, Kawachinagano; Rituo Nakayasu, Kobe, both of Japan

[73] Assignee: Sumitomo Rubber Industries, Ltd., Hyogo, Japan

[21] Appl. No.: 910,789

[22] Filed: Sep. 22, 1986

Related U.S. Application Data

[63] Continuation of Ser. No. 659,757, Oct. 11, 1984, abandoned.

[30] Foreign Application Priority Data

Oct. 12, 1983 [JP] Japan ................................ 58-190550
Oct. 24, 1983 [JP] Japan ................................ 58-198779
Oct. 28, 1983 [JP] Japan ................................ 58-203137

[51] Int. Cl.$^4$ .......................... B60C 9/06; B60C 9/11
[52] U.S. Cl. ..................................... 152/559; 152/563
[58] Field of Search ............... 152/563, 559, 557, 556, 152/548, 527, 451; 139/419; 66/193; 112/412, 429, 430

[56] References Cited

U.S. PATENT DOCUMENTS

| 585,181 | 6/1897 | Bullard | 152/358 |
| 1,374,668 | 4/1921 | Lindley | 66/193 |
| 3,249,128 | 5/1966 | Lord | 139/419 |
| 3,712,361 | 1/1973 | Streeter, Jr. | 152/563 X |

FOREIGN PATENT DOCUMENTS 159284 2/1921 United Kingdom ................ 152/358

Primary Examiner—Donald E. Czaja
Assistant Examiner—Ramon Hoch
Attorney, Agent, or Firm—Armstrong, Nikaido, Marmelstein & Kubovcik

[57] ABSTRACT

A pneumatic tire containing a ply having a knitting fabric which is formed by arranging warps parallel to each other, setting wefts on the warps to cross the warps at an angle of 60° to 90° without weaving, and twining fine knitting yarns around the warps and the wefts. The ply is used as a chafer, a bead filler or a carcass of a bias tire and reinforces the pneumatic tire. The pneumatic tire is excellent in uniformity and durability, and the weight and the cost of the tire can be reduced.

3 Claims, 5 Drawing Sheets

PNEUMATIC TIRE REINFORCED WITH FABRIC

This application is a continuation of application Ser. No. 659,757 filed Oct. 11, 1984, now abandoned.

BACKGROUND OF THE INVENTION

The present invention relates to a pneumatic tire containing a ply of knitting fabric as a reinforcement.

Hitherto, as a ply for a pneumatic tire such as a chafer, a bead filler or a carcass there has been generally employed a plane fabric or a cord fabric which is woven of warps of a tire cord arranged as a main reinforcing element and finer wefts than the warps. The wefts are roughly woven enough to maintain an arrangement of the warps and spaces between the warps.

Such a cord fabric or plane fabric is prepared as follows: the warps are arranged and shed alternately, e.g. when a warp is shed like upward, downward and upward, an adjacent warp is shed like downward, upward and downward. The weft is inserted through the series of the sheddings one after another by means of a shuttle and beaten to give the fabric.

In manufacturing a pneumatic tire, the cord fabric or the plane fabric is subjected to dipping treatment and topping treatment to prepare a ply. During the processes, however, there is a problem that the structure of the fabric is ready to be disturbed and to form a condition of so-called "slippage". Accordingly it is difficult to make the fabric rough when the density arrangement has increased too much.

For preventing the slippage of the fabric, there is proposed a method in which one weft is clamped by 2 or 3 warps to form a tire cord fabric. However, the method is complicated and requires high cost, which makes the productivity lower.

For reference, typical structures of the fabric used for conventional chafers are shown in Table 1.

TABLE 1

| Structure of chafer | | | |
|---|---|---|---|
| Cord | Material | Density (per 5 cm square) | Use of tire |
| 840 d/1 × 840 d/1 | Nylon (multiple filaments) | 30 × 30 | Tire for car and light truck |
| 1260 d/1 × 1260 d/1 | Nylon (multiple filaments) | 31 × 31 | Tire for truck and bus |
| 450 d × 450 d | Nylon (mono filament) | 48 × 48 | Radial tire for car |
| 1100 d × 1100 d | Nylon (mono filamant) | 40 × 40 | Tire for truck and light truck |
| 20 yarn No. count/1 × 20 yarn No. count/1 | Vinylon | 54 × 54 | Tire for motorcycle |
| 20 yarn No. count/2 × 20 yarn No. count/2 | Vinylon | 54 × 54 | Tire for car and light truck |

In manufacturing a bias tire using the cord fabric prepared according to the above process, the following process is generally employed. That is, the cord fabrics are cut at an angle of 20° to 70° with respect to the direction of the warp arrangement included in the fabric. The cut fabrics are welded successively to give a ply. A cylindrical carcass is fabricated on a drum by the use of at least two plies in a manner where the warps in the ply cross the warps in the adjacent ply. Then, the carcass is formed into a toroidal tire.

With respect to the carcass prepared by the process described above, there occurr the following problems. First, since the warps are easy to move because of an insufficient fixing of the warps to the wefts in the above-mentioned process and the each space between the cords has a lack of uniformity, durability of the obtained tire is lowered. Second, the warps consisting in the cord fabric have a tendency to wave owing to their structural shape which causes the cord fabric to be rugged. Therefore, the thickness of the fabric is increased apparently so that for the purpose of covering the whole fabric, there is a necessity that the topping rubber is applied to the fabric in a large amount resulting in a thick rubber layer to inhibit a contact between the cords in the fabric. It is disadvantageous from the viewpoint of a weight of tire. Third, since the cord fabric is prepared by a weaving attended with shedding the warps, there is a limit with respect to the productivity. Further, it is necessary to select the materials for the warps and the wefts so that they do not slip on each other, and a long staple cannot be preferably used for the weft.

An object of the present invention is to provide a pneumatic tire which eliminates the above-mentioned problems, and is excellent in uniformity and durability and applicable to cars, light trucks, trucks, light vehicles such as motorcycles or bicycles, and the like.

SUMMARY OF THE INVENTION

According to the present invention, there is provided a pneumatic tire containing a ply having a knitting fabric which is formed by arranging warps parallel to each other, setting wefts on the warps to cross the warps at an angle of 60° to 90° without weaving, and twining or wrapping fine knitting yarn around the warps and the wefts at each location where they are superimposed to bind the warps and wefts together.

The ply in the present invention has an excellent uniformity of the each space between the cords, because the knitting fabric can maintain the uniformity of the each space between the cords during the treatment such as dipping treatment, which makes durability of the tire increased. The ply can be used for a chafer ply, a bead filler ply, a carcass ply, and the like.

In case of using the ply for a carcass ply, the ply is cut in a bias manner and the bias-cut ply is arranged so that the warps in the knitting fabric orient to a direction at an angle of 20° to 70° with respect to the equatorial plane of the tire.

DETAILED DESCRIPTION

Figure 1:
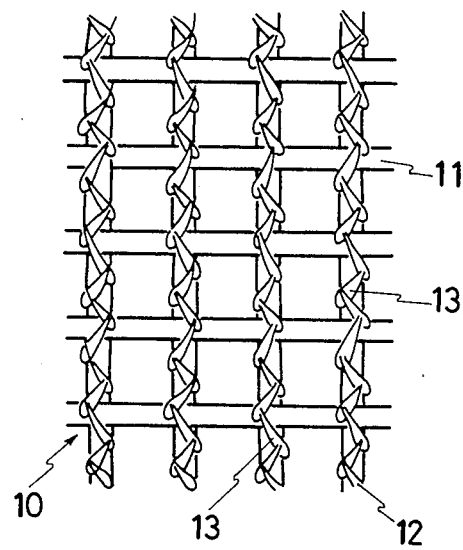
FIG. 1 and FIG. 2 are a front view and a rear view of an embodiment of the knitting fabric, respectively.
Figure 2:
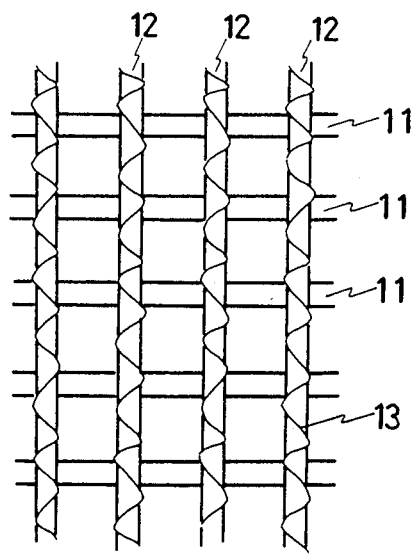

Referring to FIG. 1 and FIG. 2, a knitting fabric 10 is formed by arranging warps 11 parallel to each other, setting wefts 12 on the warps to cross the warps at an angle of 60° to 90°, preferably at almost a right angle, without weaving, and twining or wrapping a plurality of knitting yarns 13 of fine fiber around the warps and the wefts at each location where the warps and wefts are superimposed in a longitudinal direction of the warps to fix the wefts to the warps and give an integrated product. The fineness (diameter) and the density of the wefts are similar to those of the warps. Such a knitting fabric can be formed by a conventional knitting method such as warp knitting method or weft knitting method, and a raschel knitting machine can be preferably used in the weaving.

As a material of the warp usable in the knitting fabric, there can be employed an organic fiber such as a fiber of polyamide, polyester, rayon or aromatic polyamide, an inorganic fiber such as steel fiber or glass fiber, or other various materials.

According to the present invention, the material and the fineness of the weft usable in the knitting fabric is preferably the same as those of the warps. With respect to the tire of the invention, it is not necessary to select a specific material for the wefts so that the wefts will hardly slip or move. There can be used a weft that is so strong as not to break under the tensions during bonding treatment and other processes of making tires till the rubber lining process. The weft, for example, having a tension not less than 100 g/d after the adhesion treatment is completed is preferably used. Further, a long staple, which cannot be used in the plain weaving because the weft slips on it, is able to be used in the present invention. The fineness of the weft may be selected within a range of 80 to 140% of the fineness of the warp. Also the density of the weft arrangement (number of wefts per unit length) may be selected within a range of 80 to 140% of the density of the warp arrangement (number of warps per unit length), preferably the same as that of the warp.

According to the present invention, any fiber can be used for the knitting yarn so far as it is sufficiently durable under ordinary conditions at a time of adhesion treatment and heat treatment in the process for making tires, preferable it is able to bond to the rubber after the treatment. Typical examples of such a fiber are, for instance, a filament of an organic fiber such as a fiber of nylon-6, nylon-66 or polyester, and the like, having a fineness (diameter) of 5 to 50 deniers. When the fineness is less than 5 deniers, the warps and the wefts cannot be sufficiently fixed. On the other hand, when the fineness is more than 50 deniers, the ply gage increases as a result of increase in thickness of the knitting fabric disadvantageously from the viewpoint of making a tire lighter.

Figure 3:
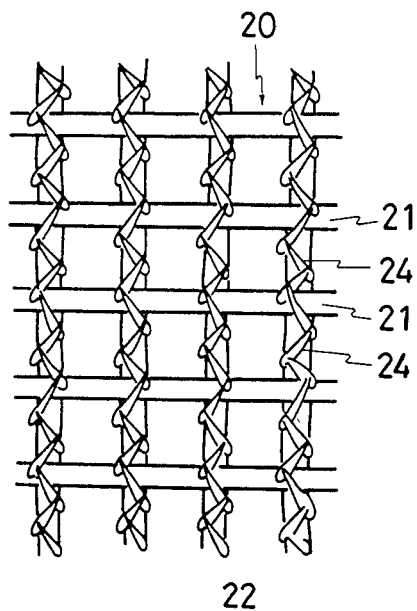
FIG. 3 and FIG. 4 are a front view and a rear view of another embodiment of the knitting fabric, respectively.
Figure 4:
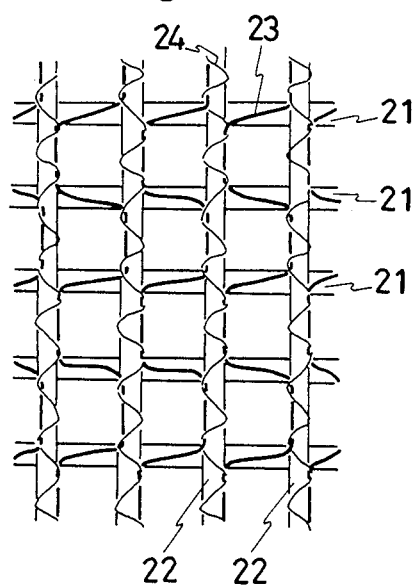

FIGS. 3 and 4 show another embodiment of a knitting fabric used in the present invention. The knitting fabric 20 shown in FIGS. 3 and 4 is formed by knitting or wrapping the warps 21 and the wefts 22 with two knitting yarns 23, 24, to bind them together at each location where the warps and wefts are superimposed and has an increased effect to prevent the warps and the wefts from slippage.

From the knitting fabric prepared according to the above-mentioned process, a ply is formed by subjecting the knitting fabric to conventional treatments such as adhesion treatment, heat treatment and topping rubber treatment, and then embedding the knitting fabric in the rubber. The thus prepared ply is cut, in a bias manner, at an angle of 20° to 70° with respect to the direction of the warp arrangement to obtain a strip. The strip is embedded as a reinforcement in various parts of a tire in the process of fabricating the tire on a drum. At that time, the ply is preferably arranged so that the warps in the knitting fabric orient to a direction at a given angle depending on the angle of the bias cutting. In this manner, the wefts which are set at an angle of 60° to 90°, preferably at a right angle to the warps, forms a bias structure. Further, since the fineness of the weft and the density of the weft arrangement are substantially the same as those of the warp, the weft can also act as a reinforcing element.

Figure 5:
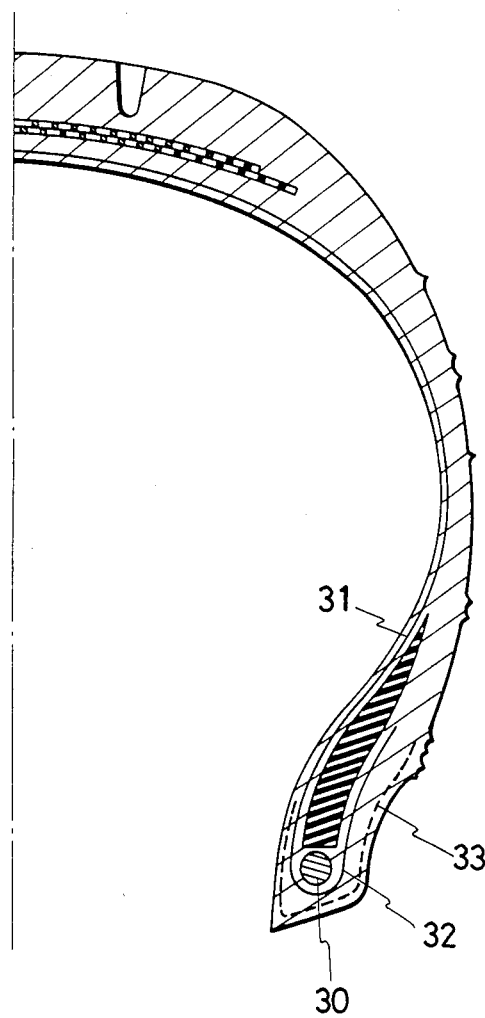
FIG. 5 is a cross sectional view of a tire according to the present invention containing the knitting fabric as a chafer.

FIG. 5 shows a right half of a pneumatic tire according to the present invention in which the ply is used as a chafer. In FIG. 5, a carcass 31 is turned around a bead core 30 at its flange, and the end of the carcass 31 is fixed. A chafer 33 made of the above-mentioned ply is arranged so as to enclose the turned portion 32 of the carcass 31. Two or more plies may be employed as the chafer.

Figure 6:
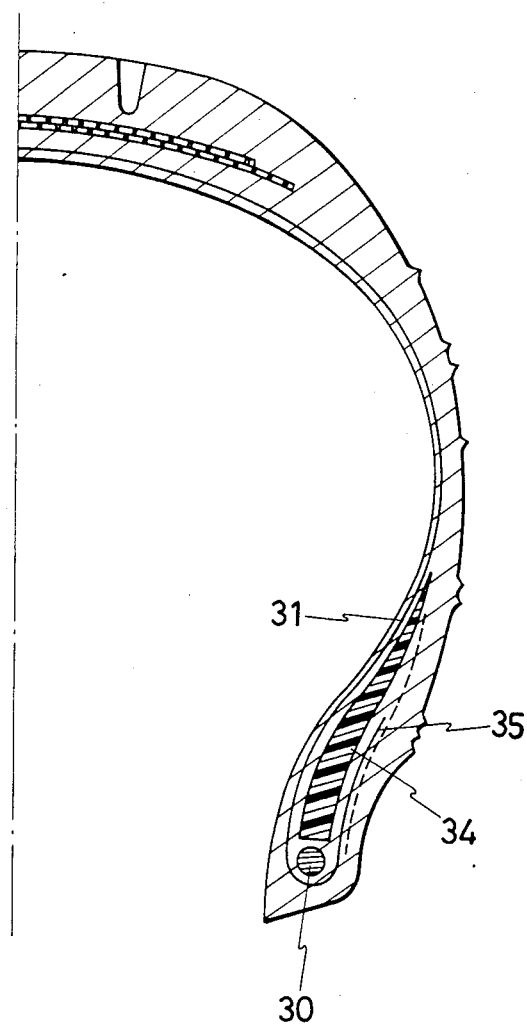
FIG. 6 is a cross sectional view of a tire according to the present invention containing the knitting fabric as a bead filler.

FIG. 6 shows a right angle of a pneumatic tire according to the present invention, in which the ply is used as a bead filler. The carcass 31 and the bead core 30 are arranged in the same manner as in FIG. 5. In this embodiment, a bead filler 34 made of the above-mentioned ply is arranged over an outside part 35 of the turned portion of the carcass 31. Two or more plies may also be employed as the bead filler.

Figure 7:
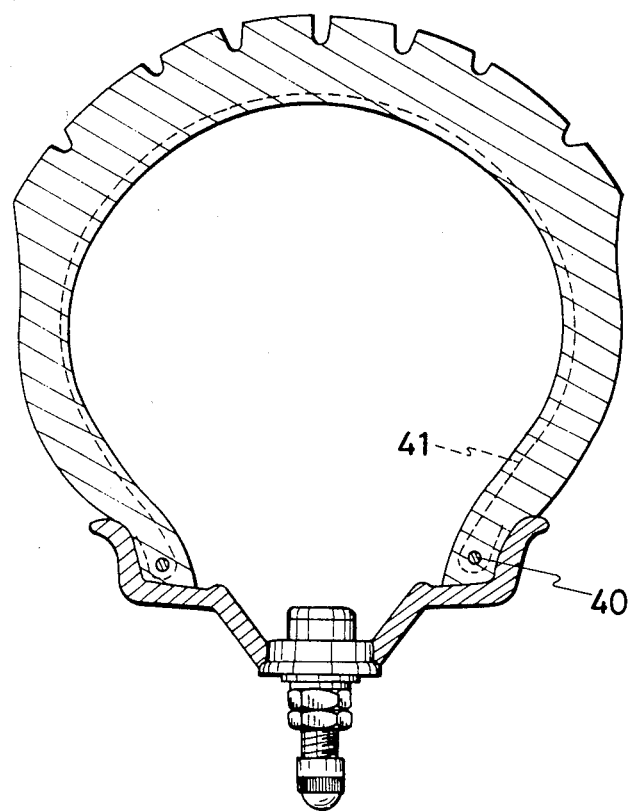
FIG. 7 is a cross sectional view of a tire according to the present invention containing the knitting fabric as a carcass.

FIG. 7 shows a cross section of a pneumatic bias tire for a motorcycle according to the present invention. In FIG. 7, a carcass 41 made of the above-mentioned ply is embedded in a tire and turned around a bead core 40 at its both flanges. Two or more plies may also be employed as the carcass.

A pneumatic tire of the present invention has the following advantages:

(1) Because the knitting fabric is not woven, the productivity is improved, and the shrinkage of the warps is eliminated, whereby a cost of the materials is lowered.

(2) Because the warps and the wefts of the knitting fabric are fixed with the knitting yarn, the uniformity and the durability of the tire are advanced or improved as a result of the uniformity of the each space between the cords.

(3) Because the warps are not woven with the wefts, the waves as seen in a conventional cord fabric are eliminated to give a ply having a small and uniform thickness, and therefore a pneumatic tire of light weight, excellent in uniformity is advantageously produced.

(4) Because the warps and wefts of the knitting fabric are fixed with a knitting yarn, a long staple can be used for the weft, whereby the wefts are made lighter and a cost of processing the wefts are lowered to give a lighter tire.

(5) A pneumatic tire can be produced by one ply made of the knitting fabric, which makes the cost reduced and the weight lighter.

What we claim is:

1. A pneumatic tire having bias structure, which comprises a carcass formed by cutting a ply having a knitting fabric is a bias manner, and arranging the bias-cut ply so that warps in the knitting fabric orient to a direction at an angle of 20° to 70° with respect to the equatorial plane of the tire; said knitting fabric being prepared by arranging the warps parallel to each other, setting wefts on the warps to cross the warps at an angle of 60° to 90° without weaving, and wrapping fine knitting yarns from both sides of the fabric at each location where the warps and wefts are superimposed to bind the warps and wefts together.

2. The pneumatic tire of claim 1, wherein the fineness of the warps is similar to that of the weft.

3. The pneumatic tire of claim 1, wherein the knitting yarn is a fiber made of organic filaments and has a fineness of 5 to 50 deniers.

* * * * *